United States Patent
Gauweiler et al.

(10) Patent No.: US 8,374,104 B2
(45) Date of Patent: Feb. 12, 2013

(54) SIMPLE INSTALLATION OF DEVICES ON A NETWORK

(75) Inventors: Bernd Gauweiler, London (GB); Richard A. Blomseth, San Jose, CA (US)

(73) Assignee: Echelon Corporation, San Jose, CA (US)

( * ) Notice: Subject to any disclaimer, the term of this patent is extended or adjusted under 35 U.S.C. 154(b) by 592 days.

(21) Appl. No.: 11/096,010

(22) Filed: Mar. 30, 2005

(65) Prior Publication Data
US 2006/0250979 A1 Nov. 9, 2006

(51) Int. Cl.
*H04L 12/28* (2006.01)
(52) U.S. Cl. .................................................. 370/255
(58) Field of Classification Search ............ 370/254, 370/255; 709/220; 710/9
See application file for complete search history.

(56) References Cited

U.S. PATENT DOCUMENTS

| 6,378,128 | B1 | 4/2002 | Edelstein et al. |
| 6,532,217 | B1 * | 3/2003 | Alkhatib et al. ............... 370/252 |
| 6,865,611 | B1 * | 3/2005 | Bragg ........................... 709/238 |
| 7,013,331 | B2 | 3/2006 | Das |
| 7,219,141 | B2 | 5/2007 | Bonasia et al. |
| 2002/0101873 | A1 * | 8/2002 | Perlman et al. ............... 370/400 |
| 2003/0200285 | A1 | 10/2003 | Hansen et al. |

OTHER PUBLICATIONS

Notification of Transmittal of International Preliminary Report on Patentability, PCT/US06/11614, mailed Apr. 5, 2007, 4 pages.

* cited by examiner

*Primary Examiner* — Yong Zhou
(74) *Attorney, Agent, or Firm* — Blakely, Sokoloff, Taylor & Zafman LLP

(57) ABSTRACT

One embodiment of the invention employs techniques for the self-installation of network devices using fire-and-forget principles. These devices modify their own network configuration data, but do not modify the network configuration data of other devices. Utilizing fire-and-forget principles, the need for a central database and central authority on the network is not required but may still be used.

20 Claims, 8 Drawing Sheets

SIMPLE INSTALLATION OF DEVICES ON A NETWORK

FIELD

At least one embodiment pertains to a network and more particularly to installing devices on a network.

PRIOR ART AND RELATED ART

Networks of every day devices are becoming more prevalent and important to our everyday life. Everything from large appliances (refrigerators, ovens, etc.), systems (HVAC, security, lighting, irrigation), and vehicle controls (in trains, automobiles, ships, planes) to smaller appliances (toasters, microwaves, etc.) are being interconnected and controlled.

Many approaches have been taken to network these devices. All approaches provide some method to allocate network resources that are used to establish communication among specific devices. The methods used to allocate network resources can be categorized as self-installed systems and managed systems. Self-installed systems do not require an installation tool to allocate network resources and establish communications; managed systems do require an installation tool to allocate network resources and establish communications.

One self-installed approach for allocating network resources is called "hailing" created by CEbus. In the hailing approach, the hailing device assigns itself a resource ID, broadcasts it to all other devices in the network, and then waits for a response from the other devices to confirm that they are not using the same resource ID. If there is a problem the original hailing device repeats the process until the hailing device receives an acceptable response. Under CEbus, if a device with a duplicate resource is turned off there is a failure in the system once it is turned back on because there will likely be two devices with the same ID and no way to resolve ownership of the ID.

Managed networks use a central server to allocate network resources. One approach is the dynamic host configuration protocol (DHCP). Under DHCP, a new device requests a network resource from a common server and the common server assigns an address to the device. With DHCP, this address is only "leased" by the device for a set period of time. For example, a device may lease an address for a day and at the expiration of that day it must renew the lease or get a new address from the DHCP server. This method introduces a single point of failure into the system, since new devices cannot be introduced if the central server fails.

Another self-installed approach is to use static addressing. Each device is assigned its own address, typically by the user of the device or by a central authority. For example, the X10 protocol uses two static addresses. One is a house code that is used as a system identifier, the other is a unit code that is used to specify communicating devices. Knowledge of the relationship between addresses and devices must be maintained by the users of the devices, which is cumbersome and difficult to maintain for more than a few devices. With a central authority, coordination is provided by the central authority, but resource management is more complex. The Internet uses a combination of static addressing controlled by central authorities and DHCP addressing with statically assigned address ranges.

What is needed is a system and method of networking devices that does not need to rely on a central server or authority for acquiring and/or maintaining addresses of devices, that does not fail when a large number of devices are turned off, and that does not require the users to maintain network resource information.

DETAILED DESCRIPTION

Overview

Figure 1:
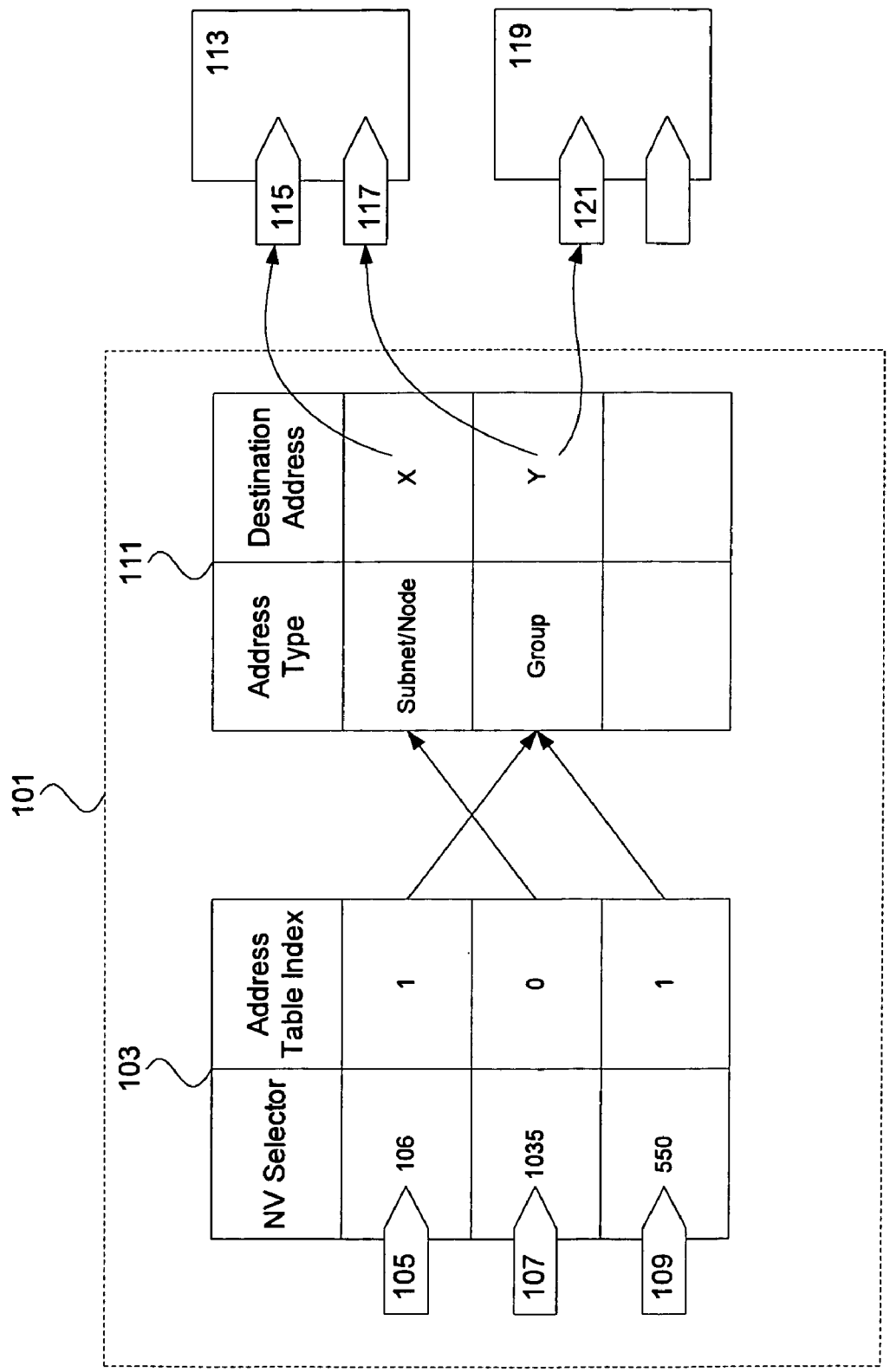
FIG. 1 is a schematic diagram illustrating an embodiment of binding.

An improved method and system for self-installing devices onto a network is described. A self-installed device is one that modifies its network configuration data, does not modify the network configuration data of other devices, and does not require intervention by another device. A self-installed network is a set of self-installed devices that exchange data over a common medium such as a twisted pair cable, power line carrier, or radio frequency carrier. A managed network is a set of devices that exchange data over a common medium such as a twisted pair cable, power line carrier, or radio frequency carrier, and require intervention by a device in the network to establish communication.

In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Device Application

A device application may be divided into one or more functional blocks. A functional block is a portion of an application of a device that performs a task by receiving configuration and operational data inputs, processing the data, and/or sending operational data outputs. A functional block may receive inputs from the network, hardware attached to the device, and/or from other functional blocks on a device. A functional block may send outputs to the network, to hardware attached to the device, and/or to other functional blocks on a device.

A device application implements a functional block for each function on the device to which other devices should communicate or that requires configuration for particular application behavior. Each functional block is defined by a functional profile. Functional profiles are templates for functional blocks and each functional block is an implementation of a functional profile.

The network inputs and outputs of a functional block, if any, are provided by network variables and configuration properties. A network variable is an operational data input or output for a functional block. A configuration property is a data value used for configuring or documenting the behavior of one or more network variables, one or more functional blocks, or the entire device. Configuration properties used to configure or document an entire device are either associated with the entire device or associated with a special type of functional block called a node object. Network tools may use node object functional blocks to test and manage the other functional blocks on a device. Node object functional blocks may also be used to enable or disable self-installation, to manage time, and to report alarms generated by a device. In another embodiment, the network inputs and outputs of a functional block, if any, are provided by application messages.

In one embodiment, each device has an associated unique ID number. The unique ID number may be used for network configuration and/or application communication. It is typically not used for application communication due to its size and lack of support for multicast communication. In an embodiment, the unique ID number is assigned when the device is manufactured.

Each device belongs to two domains according to an embodiment. A primary domain and a secondary domain. The primary domain is used for application communication. It is unique and may be associated with small units as desired. These small units include, but are not limited to, a house, an apartment, etc.

In one embodiment, all devices implementing self-installation belong to the same secondary domain which has a fixed domain ID. The secondary domain may be used for some administrative tasks and assigned such that none of the possible values of the primary domain can collide with the secondary domain ID.

At least some devices may be shipped with partial or complete pre-configured network resources. In one embodiment, the network resources consist of a domain ID, subnet ID, and node ID. A device of this embodiment is immediately operational. Alternatively, at least some devices may not be shipped with any pre-configured network resources. Accordingly, each device not shipped with pre-configured network resources must be configured to include the missing resources.

In an embodiment, any device within a domain may allocate the domain ID to a new device joining the domain. For example, this allocation may be done by a home gateway or controller. A device with the capability to allocate domain IDs is called a domain address server. In an embodiment, multiple devices within a domain may simultaneously act as domain address servers as they will all provide the same domain ID. This eliminates the single point of failure of a single server. However, domain address servers in different domains should not serve a domain ID to the same device. For example, this may occur if domain address servers in two adjacent domiciles were within network listening range of a device at the same time and the user of each domain address server attempted to add a device at the same time. In another embodiment, the domain ID is fixed for all devices or a class of devices—for example all devices from a particular manufacturer.

Subnet and node IDs are allocated for each device. These IDs provide a unique, logical address for each device. They also support direct access to devices by controllers and support detection of duplicate packets. In one embodiment, during self-installation, each device randomly assigns its own subnet and node IDs.

Network variables may be used to share data between devices. In one embodiment, each network variable has a direction, type, and length. The network variable direction is either input or output, depending on whether the network variable is used to receive or send data. Additionally, the network variable type determines the format of the data. Standard network variable definitions may be defined by an independent organization. For example, the standard network variable definitions are those published by LonMark International.

A standard network variable type (SNVT ID) is a numerical identifier used to identify a standard network variable type. SNVT IDs may be used to ensure that all network variables in a connection are of the same type. Device manufacturers may also create custom network variable types called user network variable types (UNVTs).

Network variables of identical type and length but opposite directions may be connected to allow devices to share information. A single network variable may be connected to multiple network variables of the same type but opposite direction. A fan-out connection is created when s single network variable output is connected to multiple inputs. A single network variable input that receives inputs from multiple network variable outputs is called a fan-in connection. For a useful connection, at least one input and at least one output must participate in the connection.

The application program in a device may not be required to know where input network variable values come from nor to where output network variable values will go. For example, when the application program has a changed value for an output network variable, it simply passes the new value to the device firmware. Through binding, the device firmware is configured to know the logical address of the other device, or group of devices, in the network that expect that network variable's values. Binding usually takes place during network design and installation. It allocates and assigns network resources to enable communication among devices. Similarly, when the device firmware receives an updated value for an input network variable required by its application program, it passes the data to the application program. The binding process thus creates logical connections between an output network variable in one device or a group of devices and an input network variable in another device or group of devices.

FIG. 1 illustrates an embodiment of binding. When the application of device 101 writes to a network variable such as 105, 107, or 109, firmware of the device 101 looks up the network variable (NV) selector and address table entry to use in the NV configuration table 103. In one embodiment, similar to subnet/node IDs, NV selectors are randomly selected. NV selectors are used for creating connections. Each connection is assigned a unique connection ID so that connections may be automatically verified. A connection ID is an ID that uniquely identifies a connection and may be used to detect and repair network variable (NV) selector collisions. A collision occurs when two or more distinct connections use the same NV selector value.

Device 101 then sends the update containing the selector and data value to the address in the specified entry in the address table 111. In the embodiment illustrated by FIG. 1, for NV 107 the address table index entry is 0. This maps to the first entry of the address table 111, which for this illustration is a subnet/node address. The destination address is X for this subnet/node. This address combined with selector 1035 corresponds to the address for input 115 of device 113. Similarly, the destination address Y combined with selector 106 or 109 contains the group address for input 117 of device 113 or the address of input 121 of device 119. The use of the address table 111 by the device is called implicit addressing as the device application never has to deal with any of the addressing information.

In another embodiment, applications may bypass the address table by utilizing explicit addressing. With explicit addressing, the application identifies the destination address for a network variable update or application message. Controllers may use this capability to send a network variable update to an individual device, even though the connection specifies a group connection.

In one embodiment, when sending an addressed network variable update, the application only writes the network variable value. The firmware constructs the entire message to be sent by combining the network variable value with the network variable selector and destination address. This is called implicit messaging.

In another embodiment, to send an explicitly addressed message, the application must construct the entire message. For example, when sending an explicitly addressed network variable message, the application must construct the entire message including the network variable value, network variable selector, and destination address. This is called explicit messaging.

A network variable update is event driven by a device with a network variable output. In one embodiment, a network variable update is done by polling. A polled update may be requested by a device with a network variable input. The initiating device sends a poll request to the responding device or devices, and the responding device or devices respond with a network variable update.

A non-unique device ID (NUID) is an ID that allows for establishing and maintaining device count estimates without extraneous network traffic. Device count estimates may be used to schedule regularly repeated messages to control bandwidth use. In one embodiment, a NUID is a random 8-bit value (for example, between 0-255) that each device assigns to itself during initialization.

Groups define categories of interoperable data. For example, switch inputs and outputs may be assigned a common group and appliance status outputs assigned a different group. Group IDs may be arranged by type. For example, in one embodiment group IDs 0 through 127 may be used for standard group IDs defined in the self-installation specification; group IDs 128 through 192 may be used for manufacturer-specific connections; and group IDs 193 through 255 may be reserved for use by network-management tools after upgrading a self-installed network to a managed network.

Individual devices may be designed to be a member of a single category or be a member of multiple categories. Devices assigned to multiple categories may implement multiple alternative categories or multiple simultaneous categories. For example, a room comfort-controller device may implement two simultaneous categories to supply data for thermostatic valves (a temperature-control group) and to a data-logger device (a data-logger group). A generic on/off switch may implement several alternative categories to be able to control lights, door chimes, sunblinds, etc.

Figure 2:
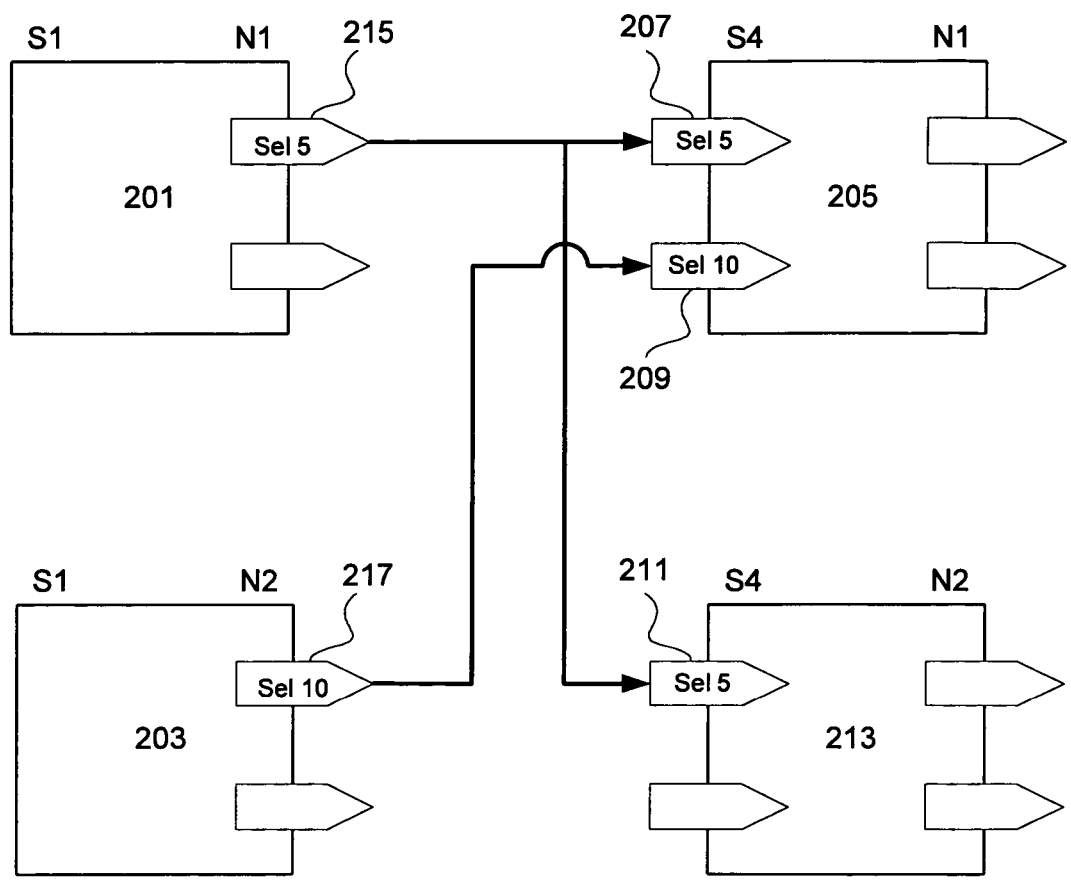
FIG. 2 is a schematic diagram illustrating an embodiment of devices interconnected.

FIG. 2 illustrates an embodiment of interconnected devices. Device 201 is a member of subnet 1 (S1) and is node 1 (N1) of this subnet. An NV output 215 of device 201 is connected to the NV inputs 207, 211 of devices 205 and 213 respectively. Devices 205 and 213 are a part of subnet 4 (S4) and are nodes 1 and 2 respectively. Device 201 may effectively control at least one aspect of devices 205 and 213 using this connection. For example, a single message may be sent from device 201 to devices 205 and 213 at the same time by using the NV selector 5. Exemplary connections include, but are not limited to, connections among devices that communicate via power line communication (PLC), other wired (twisted pair such as Category 5 or 6 cable), and wireless media.

Device 203 is also a member of S1 but is node 2 (N2). The output 217 of device 203 is connected to an input 209 of device 205. This allows device 203 to effectively control at least one aspect of device 205. A message may be transmitted from device 203 to device 205 using NV selector 10.

Figure 3:
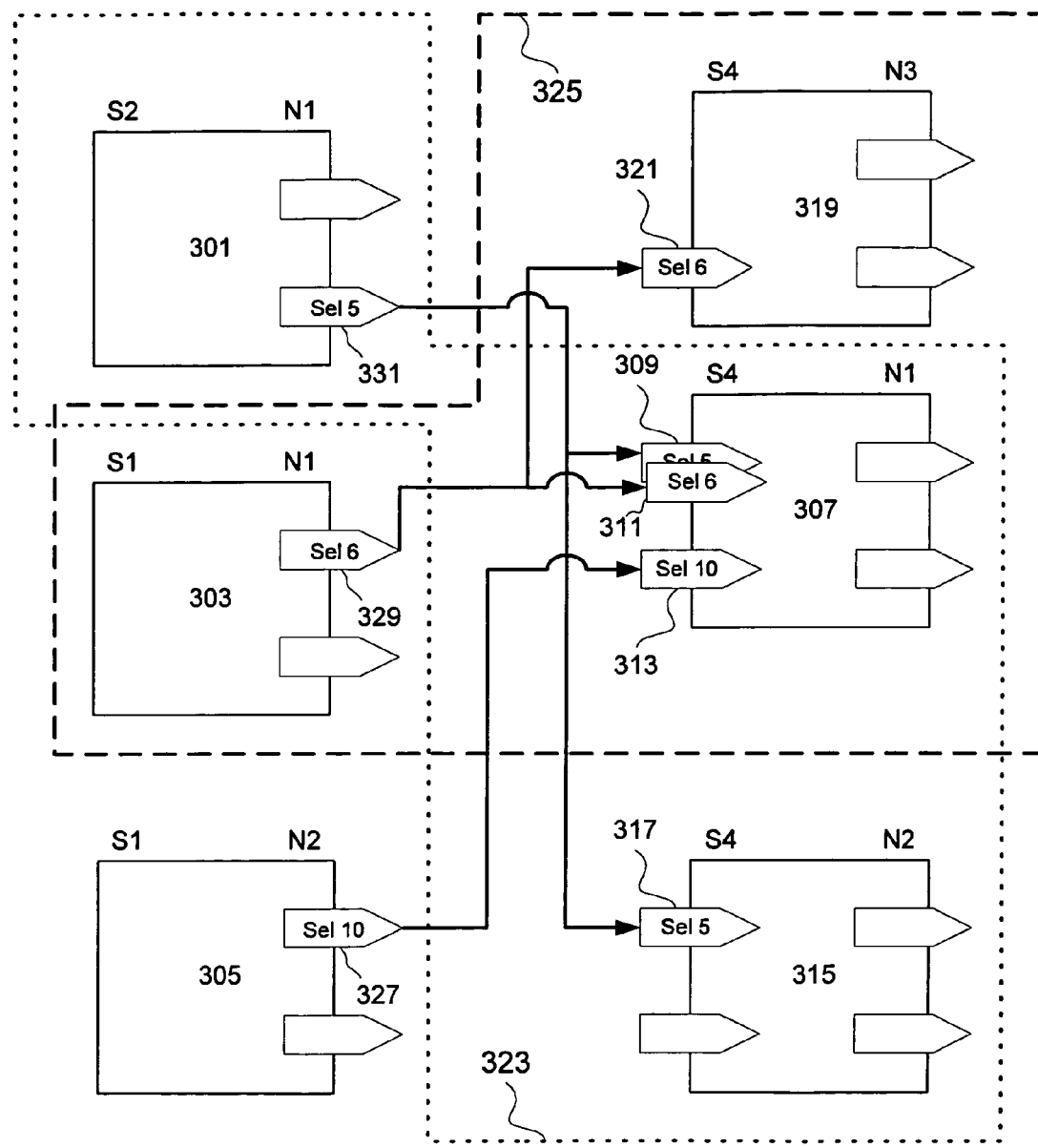
FIG. 3 is a schematic diagram illustrating an embodiment of devices interconnected.

FIG. 3 illustrates another embodiment of devices interconnected including a conflict at an NV input. Device 301 is a member of subnet 2 (S2) and is node 1 (N1) of this subnet. NV output 331 of device 301 is connected to the NV inputs 309 and 317 of devices 307 and 315 respectively. Devices 307 and 315 are a part of subnet 4 (S4) and are nodes 1 and 2 respectively. This allows device 301 to effectively control at least one aspect of devices 307 and 315 by sending a single group 323 message to NV selector 5.

Device 305 is a member of S1 and is node 2 (N2). The NV output 327 of device 305 is connected to a NV input 313 of device 307. This allows device 305 to effectively control at least one aspect of device 307. A message may be transmitted from device 305 to device 307 using NV selector 10.

Device 303 is also member of subnet 1 (S1) but is node 1 (N1) of this subnet. The NV output 329 of device 303 is connected to the inputs 321, 309 of devices 307 and 319. The NV input 309 is also connected to NV output 331 as described earlier. This creates a conflict at NV input 309. Using a different NV selector (in this case 6), device 303 can transmit a group message from its NV output 329 to the inputs 321 and 309 of devices 319 and 307 (group 325) using NV selector 6. By doing this, the message sent from 301 does not interfere with any messages sent from device 303 and the message from 301 will not reach other devices with different NV selector values such as device 319.

In another embodiment, a message may be sent regardless of the NV selector by only using subnet and/or node IDs. For example, a message may be sent to the entire subnet, the entire domain, or a particular node ID.

Application Messages

An application message includes a message type code. An application message may also include a message signature. The message signature is used to prevent a device from misinterpreting data from incompatible applications that use a duplicate message type code. Exemplary application messages include, but are not limited to, domain ID request message (DIDRQ), domain ID response message (DIDRM), domain ID confirmation message (DIDCF), domain resource usage message (DRUM), connection status message (CSMI), and timing guidance message (TIMG).

A domain ID request message (DIDRQ) requests a domain ID from a domain address server. In one embodiment, a domain ID request includes the non-unique device ID of the originator and a channel type. The channel type may be used by the domain address server to help compute propagation delay. In another embodiment, a query repeat value and a current domain query repeat value are added.

A domain ID response message (DIDRM) is a response to a domain ID request message that contains the primary domain ID. In one embodiment, this message further includes the domain ID length, an indicator for the DIDRM provider's identity, an encoded figure for the estimated maximum single-trip propagation delay, and a device count estimate. In another embodiment, an application repeater control flag and a domain response repeat value is added.

A domain ID confirmation message (DIDCM) is a notification that the user has confirmed a domain ID acquisition.

A domain resource usage message reports the subnet, node ID, device class and usage fields of the program ID, primary domain ID, primary domain ID length, channel type ID, unique ID, and the NUID for a device. DRUMs may be used to detect and resolve subnet/node ID conflicts. DRUMs may also be used to maintain device count estimates and/or discover devices on a network.

There are several possible connection status messages. Exemplary connection status messages include, but are not limited to, an open connection message, connection acceptance message, close (confirm) connection message, cancel connection message, connection deletion message, and connection status information message. In one embodiment, open connection messages (CSMO), automatic open connection messages (CSMA), and automatic connection reminder messages (CSMR) share the same message format. This format may include a combination of a connection ID, a functional profile number, a group ID, a member number, a SNVT ID, an NV selector, relevant parts of a program ID, and/or a variant. The format may further include details about the required transport (acknowledged or polled), the number of selectors consumed by the connection (connection width), and details of the network variable direction required to join this connection. Connection status messages (CSMI) include the connection ID, an NV selector, the number of selectors governed by this message and an offset into a larger set of selectors associated with this connection. Connection cancellation messages (CMSX), connection confirmation messages (CSMC), connection acceptance messages (CSME) and connection deletion messages (CSMD) share the same format, and include a connection ID and an NV selector.

The NV selector is used to identify enrolled network variables. The type of connection is identified by the group ID. The functional profile number, member number, and SNVT ID further identify the type of NV offered in the connection. The program ID may be used for selective connections. For example, target devices may implement a configuration property array of program IDs (or portions of program IDs) to be accepted for certain connections.

The open connection message (CSMO) contains details about the type of data on offer. In one embodiment, connections can only be made between matching types of network variables. In an embodiment, the CSMO contains the SNVT ID of the network variable on offer. The CSMO may further include functional profile numbers and member network variable numbers. This allows devices to understand the type of data that is on offer in an open connection.

In one embodiment, recipients can determine whether or not to enroll the connection on offer. A CSMO may also contain administrative data such as the CID, the selector, and/or the group ID. The group ID describes the type of data (for example, appliance status or system time). In one embodiment, the devices themselves accept connections from one of multiple groups and/or offer one of multiple groups. In another embodiment, each device can only accept connections from one type of device. For example, general-purpose groups may be defined to support general-purpose use-cases such as gateways or controllers. If a gateway is the connection host in key connections, it may offer connections for the general-purpose groups. A washing machine, in turn, may be designed to accept two possible groups: a more specific appliance-status group and a more general-purpose gateway group.

A CSMO message may be used to support polled output NVs using two fields. One field indicates the direction of the network variable that may be subscribed to the connection on offer. The direction field may have the following values: "input", "output", "any", and "multiple." The other field indicates a poll Boolean attribute.

Direction "any" may be used in unspecific connections. For example, "any" may be used between multiple switches and multiple lamps. Direction "multiple" may be used in connections that embrace multiple network variables with distinct direction requirements. Information about the direction requirements is communicated with the functional profile numbers and member network variable numbers. Generally, appliance connections will be direction-specific, whereas many general-purpose I/O devices will support unspecific-direction connections. This may simplify a manual connection.

A timing guidance message provides updated estimation figures for the maximum single-trip propagation delay and the device-count estimate within the domain.

Self-Installation

Figure 4:
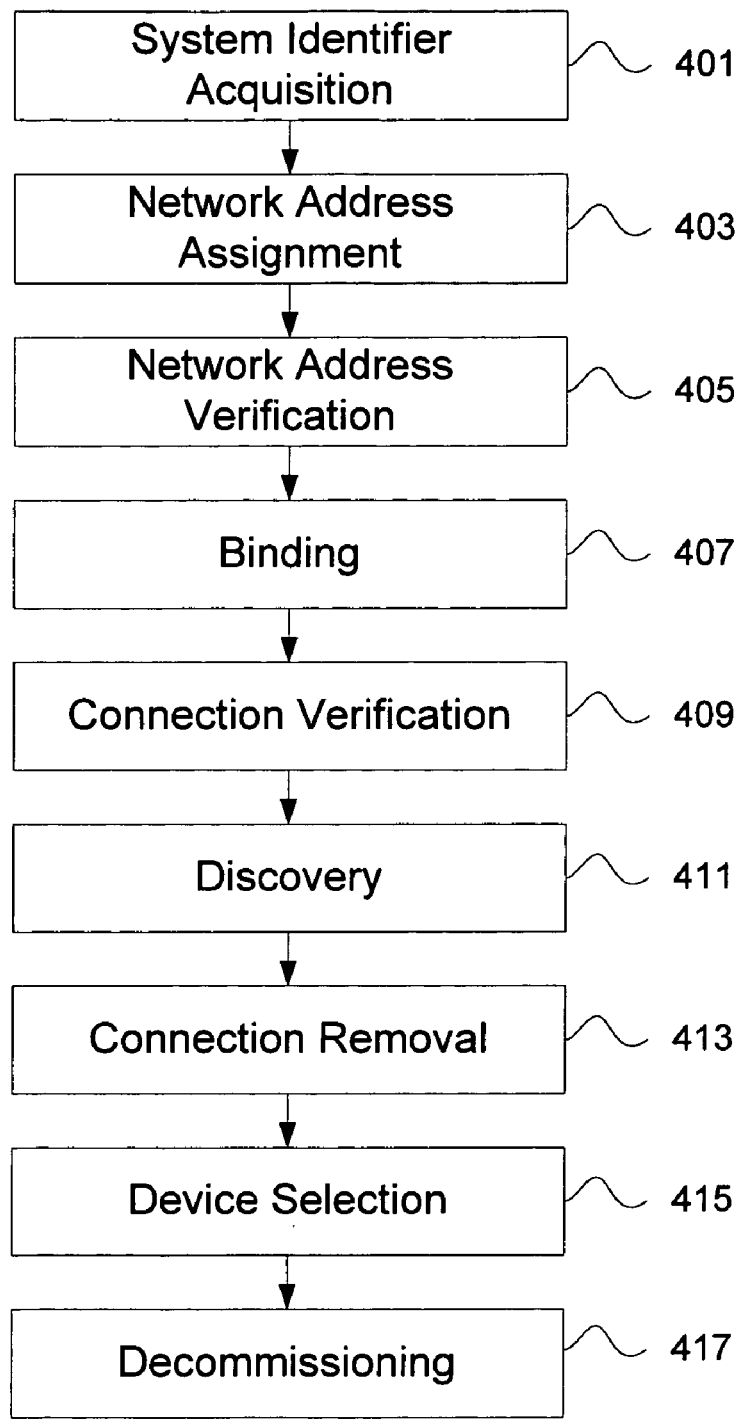
FIG. 4 is a flow diagram illustrating an embodiment of self-installation of a device.

The flowchart of FIG. 4 illustrates an embodiment of self-installation of a device.

System Identifier

At block 401, a system identifier for a network is acquired. The system identifier is used to select which network/system a device is on. For example, the system identifier may be a domain address, house code, etc. A server device may provide the system identifier. In one embodiment, this server device is referred to as a domain address server. Devices request a domain ID from the domain address server. In one embodiment, any device may serve as a domain address server. In another embodiment only certain types of devices may serve as a domain address server. In another embodiment, every device may be a domain address server. Generally, the primary domain address server for a network will be a gateway or controller for a network. In another embodiment, devices assign a fixed domain ID to themselves, eliminating the need for a domain address server.

In one embodiment, a domain address server assigns domain IDs when it is in device acquisition mode. In one embodiment, this mode is manually enabled and lasts for a limited amount of time. By minimizing the amount of time in device acquisition mode, the possibility of acquiring a neighbor's device is minimized. In another embodiment, the device acquisition mode is automatically enabled at predetermined times. In another embodiment, device acquisition mode is always enabled.

A domain address server may be requested to serve a domain address without having been assigned a domain itself. In one embodiment, it will use its unique ID as the domain ID. In another embodiment, the domain address server will randomly choose a domain ID. In another embodiment, a user will choose a domain ID, for example, based on the user's home address.

A new domain address server may join an existing network and obtain the domain ID from a domain address server or any other device already present.

Figure 7:
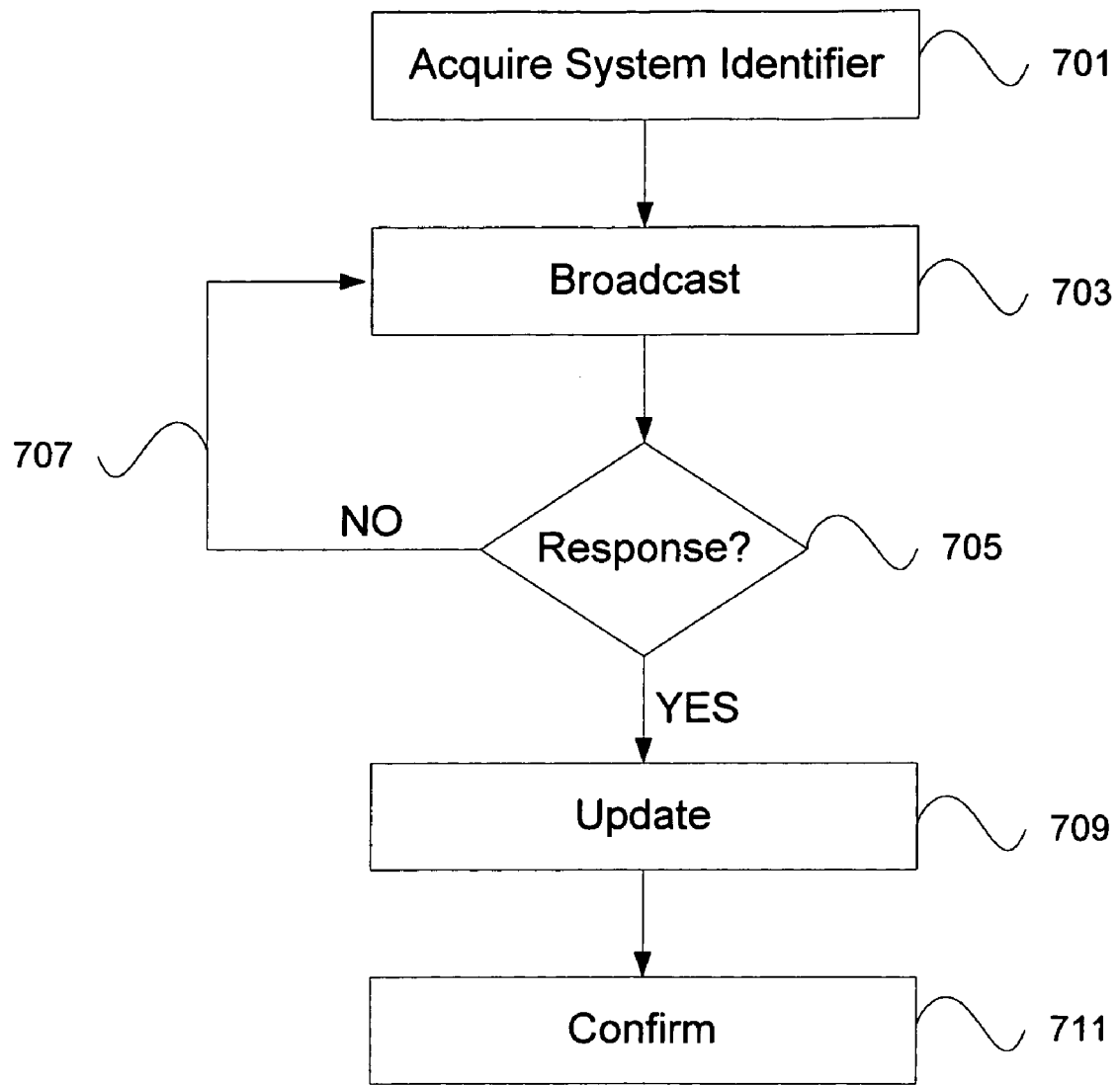
FIG. 7 is a flow diagram illustrating an embodiment of assigning a domain ID to a new device.

The flowchart of FIG. 7 depicts an embodiment of assigning a system identifier to a new device. A new device acquires the system identifier of the network at block 701. In one embodiment, the device acquires the system identifier automatically after start-up. In another embodiment, user intervention is required. In another embodiment, a fixed system identifer is used for all devices. The device acquires the system identifer of the network to ensure that devices within a network can communicate with each other, but not with devices in other networks.

In one embodiment, device network address assignment is started by pressing the service pin of a device. When the device's service pin is pressed, the device broadcasts a service-pin message. This is used when installing this device in a managed network. Device network address assignment may also be started manually by invoking some suitable part of the device's user interface if available and enabled.

At block 703, the device broadcasts a domain ID request message (DIDRQ). In one embodiment, this message is broadcast on the secondary domain.

A domain address server in device acquisition mode may respond with a domain ID response message 705. In one embodiment, only one domain address server may be in device acquisition mode at a time. If a domain address server detects another server that is also in device acquisition mode, it terminates its device acquisition mode. In another embodiment, multiple domain address servers may be in device acquisition mode.

The domain ID response message may contain a domain response repeat value. This value is set to the difference between the initial and current domain query repeat value obtained from the DIDRQ. The sender device may collect all replies to that message within a timeout period. A domain address server that responds to a domain ID request message may retrigger the device acquisition mode timer. If no response is received within the timeout period, the device may resend the message 707. Both domain query repeat values are increased at resending.

Devices not in device acquisition mode may resend the domain ID response. Typically, these devices resend if the domain response repeat value is greater than zero. This allows for increased reach of DIDRQ and DIDRM messages. Devices may enable the repeater functionality based on local signal-quality measurements and the domain address server may also enable the repeater functionality with the application repeater control flag sent as part of the domain ID response message. Devices that enable their repeater function automatically whenever they see DIDRQ messages with a difference of the initial application repeat counter should only temporarily enable their repeater.

Devices receiving a domain ID response message that belong to the same primary domain may update their local copy of the propagation delay figure and/or the estimated device count 709. In one embodiment, the propagation delay and device count estimate are the foundation for all timer calculations performed by the local device. In one embodiment, a device updates the timing figures unconditionally if the DIDRM provider is a higher-ranking device. For example, a regular device will update the local timing guidance figures and re-calculate all timers involved automatically, if the DIDRM message originates from a domain address server which is a higher-ranking device. Timing guidance data from equal-ranking devices will only be updated if it indicates worsened conditions. For example, two domain address servers may synchronize to the least common denominator, the longest propagation delay, or the highest device count estimates. Timing guidance data from lower-ranking devices may be ignored. For example, a principal domain address server may ignore timing guidance data from a secondary domain address server.

If one or more responses are received within the timeout period and all have the same domain ID, the device may provide visual feedback to the user and wait for a confirmation message (DIDCF). In one embodiment, if more than one response is received containing different domain IDs, the device may discard them all, wait a set period, and retry. In another embodiment, the device may select one domain ID to use from one of the responses. For example, in one embodiment the device selects the first domain ID received. In another embodiment, the device selects the last domain ID received.

The user confirms to the domain address server that the correct device has been selected 711. Upon user confirmation the domain address server sends a DIDCF confirmation message. When the device receives a DIDCF confirmation message, it assigns the primary domain ID from the response(s) received. In one embodiment, devices may discard and ignore the DIDCF confirmation message unless it matches the DIDRM response message selected 705.

If the entire process is repeated many times without success, the device may signal an error condition and terminate the domain ID acquisition process. The process may be repeatedly restarted, but restarting typically requires user intervention.

Network Address Assignment

At block 403 in FIG. 4, the device is assigned a network address. For example, the network address may consist of a subnet and node ID or be a unit code. In one embodiment, subnet and node IDs are assigned utilizing a "fire-and-forget" approach. Under fire-and-forget, the device will assign to itself a subnet and node ID and broadcast them ("fire") without being concerned if another device has the same subnet and node ID ("forget"). Fire-and-forget eliminates delays as devices do not wait for a response. Devices are also not required to always be on. As the network is the database, a central database and a central authority is not required. In an alternative embodiment, the device is assigned a network address without using fire-and-forget (for example, using traditional network address assignment).

Figure 5:
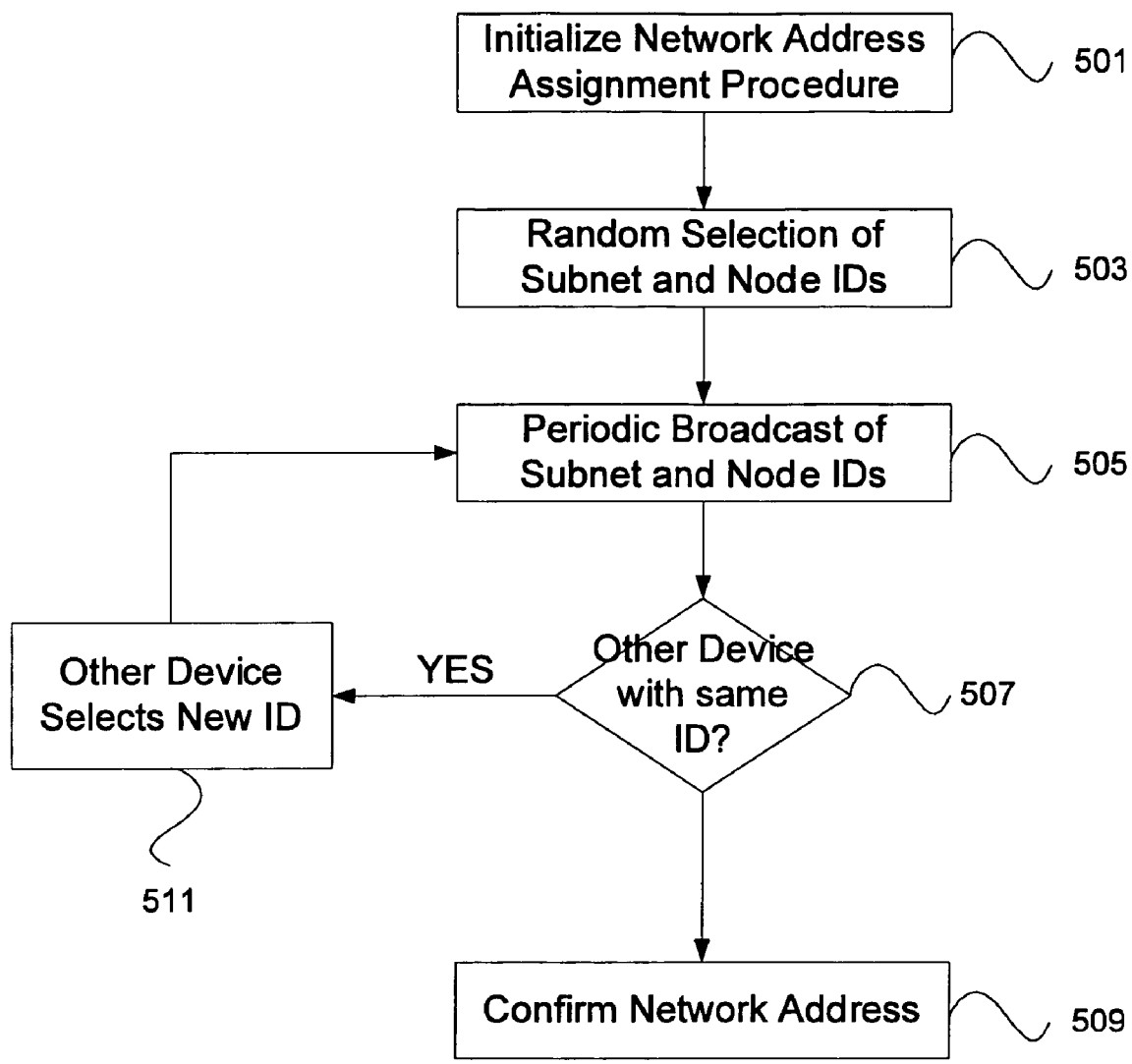
FIG. 5 is a flow diagram illustrating an embodiment of fire-and-forget network address assignment.

One embodiment of fire-and-forget network address assignment is depicted in the flowchart of FIG. 5. At block 501, network address assignment is initialized. At block 503, the device acquires a subnet and node ID and sets them in the primary domain. In an embodiment, the subnet and node IDs are randomly selected.

The device broadcasts its subnet and node ID at block 505. For example, the device may broadcast a single domain resource usage message (DRUM) or periodically or sporadically send multiple DRUMs to the network depending upon the embodiment utilized. In one embodiment, the secondary domain is used to broadcast the DRUM.

A device receiving a DRUM with a duplicate subnet and node ID and the same primary domain ID 507 reconfigures its subnet and node ID using the network address assignment procedure 511, 505. In an embodiment, the device further ensures that the duplicate ID is not assigned again to itself.

If no other device has the same subnet and node ID, the device's network address is considered confirmed 509.

Network Address Verification

Network address assignment of a device is verified to determine if the network address of the device is valid 405. This is important when a device that has already had its network address assigned is powered off and then is later powered back on. While the device is powered off, it is possible that its network address will be assigned by another device. To detect address conflicts, all devices periodically resend their network address. In one embodiment, the network address is sent in a DRUM, and DRUMs are sent at fixed intervals. For example, in a smaller network a DRUM may be sent every 10 seconds. In another embodiment, the number of non-unique device IDs (NUIDs) of the devices are used to determine how often to send DRUMs. By knowing (or approximately knowing) the number of NUIDs, the frequency of sending DRUMs can be adjusted. For larger networks DRUMs will be sent out less frequently per device than for a smaller network. One or more devices may know the number of NUIDs. That device determines the rate of sending DRUMs. That device may send that number to all devices that it knows about and each device or group of devices determines the rate at which to send DRUMs.

As with initial allocation, any device receiving a DRUM with a different ID, the same primary domain ID, and duplicate subnet/node ID reconfigures itself using the network address assignment procedure (for example, the network address assignment of block 403). To assist with device count estimations, the DRUM message may also contain the sender's NUID.

Binding

Creating Communication links or "binding" occurs by assigning NV selectors or group IDs 407. In one embodiment, binding may be invoked at any time. Binding may also be automatically or manually initiated. When using automatic binding, no user intervention is required to create connections. When using manual binding, the user chooses the device to become the host of a connection. This may be done by selecting the first device that is to participate in a connection (for example, pressing a button on the device). This first device selected will become the host.

In an automatic connection scenario, the device's application makes an educated decision based on the knowledge of expected devices in the system. Without more knowledge available, the device that initiates the data transfer will become the host. For example, without further knowledge, a device that automatically enrolls in connections will become the host for its output network variables. The device may also become host for connections that relate to the device's polling input network variables. With further knowledge of a system, automatic binding scenarios may be implemented differently. For example, in one embodiment, the gateway device may automatically become the host for input network variables that may be bound to several output network variables from appliances. This approach saves some resources (for example, selectors and aliases), but only works for those devices that follow this policy. Aliases "mirror" NVs by using a different selector.

Connections are created during an open connection period. This may be initiated by a user, by an application, or be active at all times. A connection host is used to initiate the open connection period. In an embodiment, any device in a connection may be the connection host. In an alternative embodiment, only certain devices may be the connection host. The connection host defines the open connection period and selects a NV selector to be used by all network variables within the connection. In one embodiment, NV selectors may be assigned using a similar fire-and-forget algorithm as used for subnet and node ID assignment.

In an embodiment, with fixed group mapping with fire-and-forget selector assignment, each category of inputs and outputs uses its own group. Additionally, each connection uses its own selector. This combination allows for support for many connections.

In another embodiment, with fixed selector mapping and manually assigned groups, each category of inputs and outputs uses its own selector and each connection uses its own group. Typically, the group is manually set by the user. This supports manual and positional binding.

In yet another embodiment, a combination of fixed group and fixed selector binding is used. This is may be done by using different ranges of groups.

Multiple connections may be created during binding. For example, consider a scenario in which a home gateway device implementing automatic binding and acting as a connection host for its main input network variables with two appliances present at the time the gateway springs into life. The gateway opens a connection, appliances A and B accept the connection, and the connection is operational. Appliance C implements another embodiment using automatic binding meaning that C will automatically become the connection host for its non-constant, non-polled, output network variables. Assume these network variables include one that matches the one used in the earlier connection. C will open the automatic connection, and the gateway device will accept the connection. Normally, this would allocate an input network variable alias on the gateway device, to accommodate for the two distinct selector values. However, devices that automatically start binding proceedings normally do so after acquiring the domain ID. In this case, appliance C will join the initial (first) connection and share the same ID and selector. If appliance C fails to join the existing connection, it will enroll a new, parallel connection using a different selector and an input alias on the gateway.

In one embodiment, multiple connection sessions for multiple connections on different connection hosts may be open at the same time. Each device may support multiple concurrent pending connection sessions. For example, polling input network variables may be supported.

Figure 6:
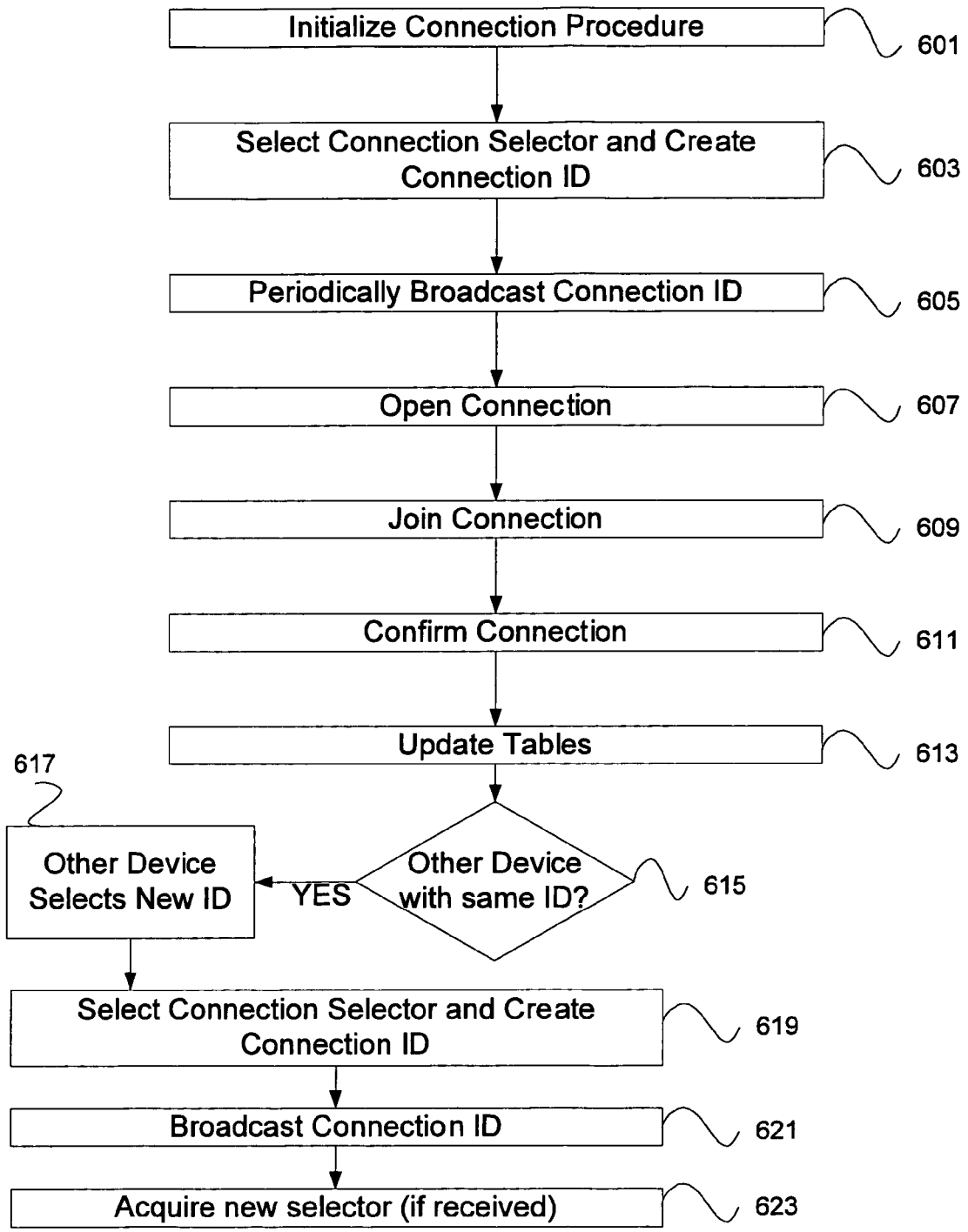
FIG. 6 is a flow diagram illustrating an embodiment of fire-and-forget binding and verification.

An embodiment of fire-and-forget binding and verification is depicted in the flow chart of FIG. 6. At block 601, for manual binding, the user identifies a network variable to be enrolled in a new connection. This is typically done by the user pressing a button on the device that is to be connected. At block 601, for automatic binding, device applications may automatically become a connection host for one or more of their network variables. The binding procedure may be repeated once per connection to be created on each connection host. Devices may support multiple concurrent connections. For example, a single device may support multiple switches with one or more connection(s) each. In this case, when using manual binding, the device may provide ways of connecting for the user that allows the user to determine which connection is to be made. For example, the user may press a single connect button on the device once for the first connection, twice for the second, etc. Alternatively, there may be a single connect button per network variable, for example, one button per switch. More sophisticated devices, for example room temperature controllers with multiple buttons and/or an LCD display, may provide a different and easier to use method for multi-connection management. In another embodiment, devices may enroll multiple network variables in a single connection. The set of network variables associated with a given connection on each device is known as the assembly. An assembly is a set of one or more network variables, or one or more functional blocks or parts thereof, or any combination of these.

The connection host chooses an NV (connection) selector or range of NV selectors at block 603. Once chosen, the NV selector(s) is used by the network variables that may enroll in the same connection. In one embodiment, an NV selector is randomly chosen.

In an embodiment, when choosing the NV selector value, the connection host ensures local uniqueness. For example, a connection host may choose a new selector value if the NV selector chosen is already in use by another connection known to the connection host device. The connection host may also assign a unique connection ID for the connection. In one embodiment, the unique connection ID contains the connection host's unique ID, an NV index, and an alias number.

In another embodiment, the unique connection ID contains the connection host's unique ID and a locally unique serial number.

At block 607, the connection host broadcasts an open connection message (CSMO) to the primary domain signaling an open connection period. The connection host may periodically repeat this message until the connection is confirmed or cancelled. For automatic binding, an automatic connection message (CSMA) is used instead of CSMO. CSMO and CSMA share the same format, but allow receiving devices to distinguish between automatically and manually initiated connections.

In one embodiment, receiving devices determine whether to accept a connection request based on at least one of the following: the functional profile, member number, group ID, and/or NV type ID. A device may indicate provisional approval of acceptance. For example, a device may flash a LED, alerting the user that it has provisionally accepted the connection. To provisionally accept a connection means to confirm that this is an acceptable and possible connection for the device to participate in.

In an embodiment, a device provisionally accepting a connection may manually add one or more network variables to the connection. In another embodiment, connection approval is automatic. The connection is approved at block 609. The user or device application identifies network variables to be added to the connection. For manual binding, this is typically done by the user pressing a button on the device to be connected. For automatic binding, device applications may automatically add one or more of their network variables. For example, a controller may automatically join connections when new devices are added to the network. As a device is selected, either automatically or manually, it may send a connection acceptance message (CSME) and may provide visual or audible feedback to the user to signal the approval of the connection.

If the connection was initiated manually, the user manually closes the connection at block 611. For example, the user may close a connection by pressing a button on the connection host. In one embodiment, when closing a connection, the connection host broadcasts a connection confirmation message (CSMC) to the primary domain. This signals a closed connection period. Upon receiving a CSMC, selected devices may use the NV selector and/or group ID to create a connection. The connection host may write the NV selector and group ID into a network configuration table at block 613, and update other device tables as needed. In one embodiment, the connection host may close the connection if at least one connection acceptance message (CSME) has been received.

In one embodiment, if the connection is not closed within a set period of time, the connection host will cancel the connection. To cancel the connection, the connection host broadcasts a cancel connection message (CSMX) to the primary domain, signaling a cancelled connection period. The connection host may also cancel the connection if an open connection message is received from another device within the domain.

In an embodiment, if a device has provisionally accepted or approved an open connection but does not receive manual or automatic confirmation or cancellation, the device discards the open connection after a set period of time.

Connection Verification

Connection verification 409 verifies that a communication link is valid. In one embodiment, connection host devices periodically resend a connection status information message (CSMI) for each connection that they host on their primary domain. In another embodiment, CSMI messages are sent one at a time for each connection, cycling through the connections on each update.

A connection host device receiving a connection status message 615 with a duplicate NV selector and different connection ID may reconfigure itself by assigning a new selector 617. In an embodiment, the new selector is a function of the old selector, the connection ID and the number of selectors used with this connection (its width). In another embodiment, the new selector is randomly chosen. The new connection ID is broadcast at block 621.

A device receiving a connection status message with a different NV selector and duplicate connection ID reconfigures itself by assigning the new (different) selector 623.

A device that is a connection host for automatically enrolled connections may also monitor DIDRM messages. The device may propagate a CSMR message for each connection for which the device acts as an automatic connection host. The CSMR message data equals that of the CSMA message. Devices receiving a CSMR message that refers to a connection to which they already belong may discard the message. Devices receiving a CSMR where the message relates to a connection to which the receiving device is prepared to enroll may enroll to that connection. This allows for new appliances to be added to the network and to join existing connections as needed.

Discovery

Discovery 411 enables a device to learn the network addresses and/or program types for all devices in a network. Discovery 411 is typically only used by gateways and controllers. As devices may send a DRUM, any device on the network can learn about every other active device on the network that is within network listening range by monitoring the DRUMs. This is useful for controllers that control many other devices or that monitor data from many other devices. Such controllers may monitor DRUMs and build a device table containing details of all devices with which the controller interacts. Exemplary details may include a device's network address and other details provided with a DRUM. In one embodiment, this table is constructed and maintained by the controller application. In another embodiment, this table is constructed by the self-installation firmware. Any device constructing such a device table should monitor DRUMs and update the table with new devices, devices with changed addresses, and deleted devices. To detect deleted devices, the device application monitors the time of update for each device-table entry and detects stale entries that no longer have corresponding DRUMs.

Connection Removal

Connection removal 413 removes a communication link. The connection removal 413 may be manually or automatically initiated. Once initiated, a device may broadcast a connection deletion message (CSMD) to the primary domain. This signals a deleted connection and causes all enrolled devices to delete the NV selector and group ID (if not in use by another connection) from their network configuration. In one embodiment, connection removal is not required.

Device Selection

Device selection 415 enables a user to perform an action on a device. Device selection 415 is typically only used by gateways and controllers. A gateway or controller may request this action and/or create a device address table of all devices in a network, or a subset of the devices, based on an ID. By using explicitly constructed network variable updates or polls, the controller application has individual access to any device and network variable in the network. This allows the controller application to use the network address acquired during network address assignment and the network variable selector acquired during binding. For a network variable update or poll, the controller application may use the assigned selector with the subnet and node ID from the address table. Decommissioning Decommissioning 417 enables a user to perform an action on a device to remove all configuration data. Exemplary configuration data includes, but is not limited to, the domain address, network address, and connections (communication links). Decommissioning 417 may also be used by devices that do not support connection removal. Self-installed devices may support a manual mechanism for this, even without a network connection. For example, a self-installed device may initiate decommissioning 417 when the user presses and holds the service button for 10 seconds. To complete the decommissioning 417, the device application clears the configuration data and then stops sending DRUM and CSMI messages.

Figure 8:
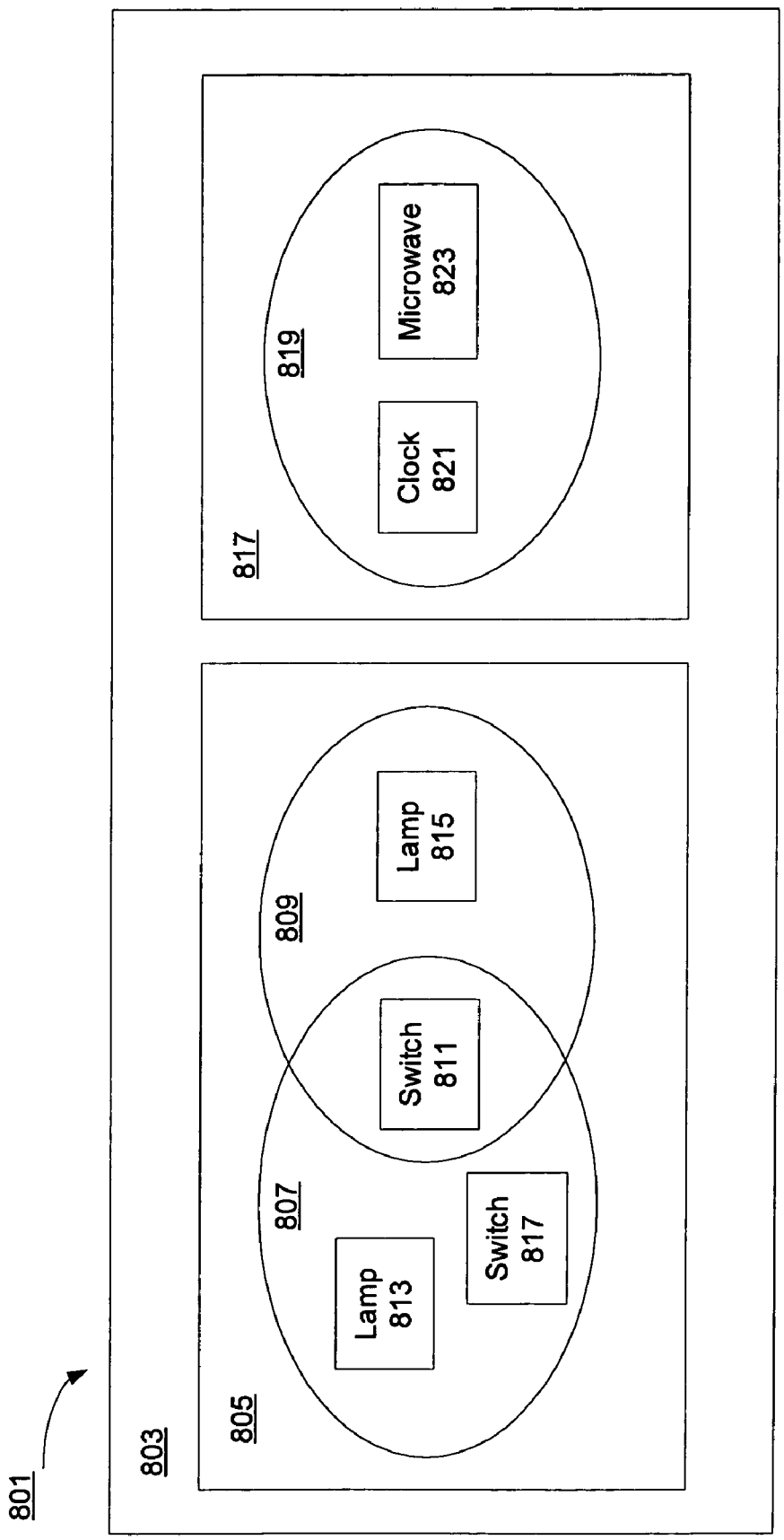
FIG. 8 is an illustration of a home network in accordance with an embodiment of the invention.

FIG. 8 depicts an illustrative home network according to an embodiment. This network 801, contains a domain 803 that devices of the network reside on. NV Selector_1 805 is associated with both the dining room 807 and kitchen 809 groups. Using this common selector 805, the "all off" switch 811 may be used to control devices in each group (for example, the lamps 813, 815). Additionally, the switch 817 in the dining room group 807 may be used to control the lamp 813 of the dining room group.

On the same domain, another selector (NV Selector_2) 817 is associated for another group (time) 819. This selector 817 may be used to control the devices of the group (for example, clock 821 and microwave 823).

Without further knowledge of the other selector of the domain 803 the dining room and kitchen groups 807 and 809 cannot control the time group 819 and vice-versa.

Embodiments of this invention may be used as or to support a firmware and software (program) code executed upon some form of processing core (such as a microprocessor) or otherwise implemented or realized upon or within a machine-readable medium. A machine-readable medium includes any mechanism for storing or transmitting information in a form readable by a machine (e.g., a computer). For example, a machine-readable storage medium can include, but not limited to, a read only memory (ROM), a random access memory (RAM), a magnetic disk storage media, an optical storage media, a flash memory device, or the like. In addition, a machine-readable propagation medium can include propagated signals such as electrical, optical, acoustical or other form of propagated signals (e.g., carrier waves, infrared signals, digital signals, etc.).

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For example, fire-and-forget principles are applicable in environments including those described in greater detail above (i.e., with domain IDs and subnet/node addresses), environments such as those utilized by the X10 (i.e., with house and unit codes), and CEbus protocols, etc.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of interconnecting devices in a network of devices, comprising:
   a first device assigning itself a network address without regard to network addresses assigned to other devices of the network in a first domain of the network, wherein the network address consists of a subnet and node identifier;
   broadcasting the assigned network address of the first device to other devices on the network over a second domain, wherein if a second device has that network address then the second device assigns itself a different network address and the first device keeps the assigned network address, and the first and second domains are different;
   binding the first device to create a connection to the network without waiting for a response to the broadcasting; and
   verifying the connection of the first device in the network.

2. The method of claim 1, further comprising:
   discovering other devices on the network.

3. The method of claim 1, further comprising:
   removing the first device's connection.

4. The method of claim 3, further comprising:
   maintaining a device interaction table stored in a controller, wherein the controller is a device in the network.

5. The method of claim 4, further comprising:
   decommissioning the first device to remove all connection data associated with the first device.

6. The method of claim 4, further comprising:
   deleting devices from the device interaction table that have reported their network address for a period of time.

7. The method of claim 1, wherein verifying the connection further comprises:
   periodically receiving a device resource usage message from a second device on the network, wherein the device resource usage message contains the network address associated with the second device; and
   determining if the first and second devices share the same network address.

8. The method of claim 1, wherein assigning a network address further comprises:
   selecting the subnet and node ID for the first device.

9. The method of claim 1, further comprising:
   selecting a new subnet and node ID for a second device if the second device has the same subnet and node ID as the first device; and
   broadcasting the new subnet and node ID of the second device on the second domain.

10. The method of claim 1, wherein binding the first device to create a connection to the network further comprises:
    selecting a connection selector and creating a connection ID;
    broadcasting the connection ID;
    opening a connection period;
    approving at least one connection requested during the connection period; and
    closing the connection period.

11. The method of claim 10, further comprising:
    selecting new connection ID for the first device if a second device has the same connection ID;
    broadcasting the new connection ID of the first device; and
    acquiring a new connection selector.

12. A system, comprising:
    a first self-installing network device;

a second self-installing network device coupled to the first self-installing network device on a first domain, wherein the first self-installing network device to broadcast a device resource usage message including a network address of the first self-installing device to the second self-installing network device over a second domain upon the assignment of network address to alert the second self-installing network device of the first self-installing network device's network address and wherein the second self-installing network device to choose a different network address if the network address in the device resource usage message is the same as the network address of the second self-installing network device and the first device keeps the network address broadcasted in the device resource usage message; and at least one network domain to facilitate communication between the devices.

13. The system of claim 12, wherein the self-installation is used for device network address assignment and binding.

14. The system of claim 12, wherein at least one of the self-installing network devices operates as a controller.

15. The system of claim 14, wherein the controller determines the size of the network based on messages received from other devices in the network.

16. The system of claim 15, wherein the size of the network determines the frequency of the periodic broadcast of the device resource usage message.

17. A non-transitory machine-readable storage medium including a program code which, when executed by a machine, cause the machine to perform the operations of:

a first device assigning itself a network address without regard to network addresses assigned to other devices of the network in a first domain of the network, wherein the network address consists of a subnet and node identifier;

broadcasting the assigned network address of the first device to other devices on the network over a second domain, wherein if a second device has that network address then the second device assigns itself a different network address, the first device keeps the assigned network address, and the first and second domains are different;

binding the first device to create a connection to the network without waiting for a response to the broadcasting; and verifying the connection of the first device in the network.

18. The non-transitory machine-readable storage medium of claim 17, wherein assigning a network address to a device further comprises:

selecting the subnet and node ID for the device;

broadcasting the subnet and node ID of the device over the second domain; and confirming the network address of the device.

19. The non-transitory machine-readable storage medium of claim 17, further comprising:

selecting new subnet and node ID for a second device if the second device has the same subnet and node ID as the first device; and broadcasting the new subnet and node ID of the second device over the second domain.

20. The non-transitory machine-readable storage medium of claim 17, wherein binding the network variables of the device to create a connection to the network further comprises:

selecting a connection selector and creating a connection ID; broadcasting the connection ID;

opening a connection period;

approving at least one connection requested during the connection period; and closing the connection period.

* * * * *